United States Patent
Chanin et al.

(10) Patent No.: US 9,223,907 B2
(45) Date of Patent: *Dec. 29, 2015

(54) SYSTEMS, METHODS AND USER INTERFACE FOR GRAPHICAL CONFIGURATION FOR ROOF MOUNTS

(71) Applicant: IronRidge, Inc., Hayward, CA (US)

(72) Inventors: Steven Chanin, Palo Alto, CA (US);
Elliot Larson, San Francisco, CA (US);
William Kim, San Mateo, CA (US);
Jonathan Ash, Phoenix, AZ (US)

(73) Assignee: IRONRIDGE, INC., Hayward, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/472,210

(22) Filed: Aug. 28, 2014

(65) Prior Publication Data
US 2015/0081255 A1 Mar. 19, 2015

Related U.S. Application Data

(63) Continuation of application No. 13/220,367, filed on Aug. 29, 2011, now Pat. No. 8,826,163.

(51) Int. Cl.
G06F 3/048 (2013.01)
G06F 17/50 (2006.01)
G06F 3/0484 (2013.01)
H02S 99/00 (2014.01)

(52) U.S. Cl.
CPC ............ *G06F 17/5004* (2013.01); *G06F 3/048* (2013.01); *G06F 3/04842* (2013.01); *H02S 99/00* (2013.01); *G06F 2217/02* (2013.01)

(58) Field of Classification Search
None
See application file for complete search history.

(56) References Cited

U.S. PATENT DOCUMENTS

| | | | |
|---|---|---|---|
| 6,546,535 | B1 | 4/2003 | Nagao et al. |
| RE38,988 | E | 2/2006 | Dinwoodie |
| 7,529,650 | B2 | 5/2009 | Wakelam et al. |
| 8,826,163 | B1 | 9/2014 | Chanin et al. |
| 2007/0291036 | A1 | 12/2007 | McArdle et al. |
| 2009/0234692 | A1 | 9/2009 | Powell et al. |
| 2010/0217565 | A1 | 8/2010 | Wayne et al. |
| 2010/0217639 | A1 | 8/2010 | Wayne et al. |

OTHER PUBLICATIONS

10+ ways to use AutoCAD object selection. Edwin Prakoso. Jul. 10, 2009.
Haticon solar. Assembly instructions flat roof application for framed and frameless PV-modules. Copyrighted 2009. Accessed Dec. 15, 2010. 1-11.

(Continued)

*Primary Examiner* — Matt Kim
*Assistant Examiner* — Mahelet Shiberou
(74) *Attorney, Agent, or Firm* — Wilson Sonsini Goodrich & Rosati

(57) ABSTRACT

Systems, methods and user interfaces for graphical configuration for ballasted roof mounts of non-rectangular solar arrays. A graphical interface may be provided to allow a user to view a roof grid, and place solar modules within the roof grid where desired, to account for various obstacles on a roof, to create a non-rectangular solar array. Using the layout of the array and various site parameters (building height, wind speed, etc.) and solar module parameters (wide, length, thickness, etc.), the system may calculate a complete bill of materials, customer pricing, ballasting requirements and overall roof loads for a complete solar project.

20 Claims, 22 Drawing Sheets

(56) References Cited

OTHER PUBLICATIONS

Haticon solar. Assembly instructions ground-mount application frameless thin film PV-modules. Copyrighted 2009. Accessed Dec. 15, 2010. 1-8.

Haticon solar. Assembly instructions ground-mount application landscape mode framed PV-modules. Copyrighted 2009. Accessed Dec. 15, 2010. 1-9.

Haticon solar. Assembly instructions ground-mount application portrait mode framed PV-modules. Copyrighted 2009. Accessed Dec. 15, 2010. 1-8.

Haticon solar. Assembly instructions pitched roof application for framed PV-modules. Copyrighted 2009. Accessed Dec. 15, 2010. 1-10.

Haticon solar. Product brochures. Accessed Dec. 15, 2010. www.haticonsolar.com/product/white.

Haticon solar. Technical data sheet. Effective May 1, 2010. www.haticonsolar.com/prdocut/technical-information.

Mage Industrie holding AG. Company website. Accessed Dec. 15, 2010. Sun.tra-mage.com.

Notice of Allowance dated Apr. 25, 2014 for U.S. Appl. No. 13/220,367.

Office Action dated Sep. 30, 2014 for U.S. Appl. No. 13/220,367.

Tra-Mage Roof accessory systems. Mage solar mount estimation tool. Mage sunfixings. Accessed Oct. 22, 2010. solarmountestimator.com.

Tra-Mage Roof accessory systems. Mounting instructions standard roof mount extruded aluminum. Accessed Dec. 15, 2010. 1-12.

Tra-Mage Roof accessory systems. Retail price list. Apr. 1, 2010. www.tra-mage.com.

Unirac. Bright thinking in solar. Company press releases. Accessed Dec. 15, 2010. www.unirac.com.

Unirac. Quick ULA specification guide. Accessed Dec. 15, 2010. www.unirac.com/estimator_pcula.

FIG. 7

Weight Requirements

| | 1 | 2 | 3 | 4 | 5 | 6 |
|---|---|---|---|---|---|---|
| North | 227.5 | 201.3 | 175.0 | 148.8 | 122.5 | 105.0 |
| Internal | 166.3 | 140.0 | 113.8 | 96.3 | 70.0 | 52.5 |
| South | 96.3 | 78.8 | 61.3 | 43.8 | 35.0 | 35.0 |

Block Weight: 35 lbs

| Miscellaneous Total Array | |
|---|---|
| 1 | Total Number of Modules on Northern Edge of Array (North side of Ballasting Tray can not be connected to additional modules) | 53 |
| 2 | Total Number of Modules on Western Edge of Array | 47 |
| 3 | Total Number of Modules on Eastern Edge of Array | 47 |
| 4 | Total Number of Modules on Southern Edge of Array | 53 |
| 5 | Total Number of North Row Modules on East or West Edge | 22 |
| 6 | Total Number of Southern Trays not classified as a Southern Tray | |

| Tray Replacement Classification (Only applicable for southern most trays of an array) | | | | | |
|---|---|---|---|---|---|
| Northern Row Modules Trays | | | | | |
| 5 - E/W Connect | 4 - E/W Connect | 3 - E/W Connect | 2 - E/W Connect | 1 - E/W Connect | North Row | Total |
| 4 | 0 | 0 | 0 | 0 | 0 | 4 |

FIG. 17

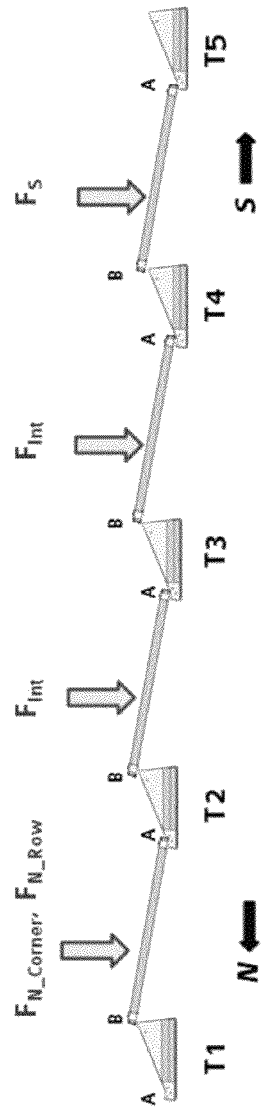
Figure A: General Description of Wind Loads and Tray Nomenclature
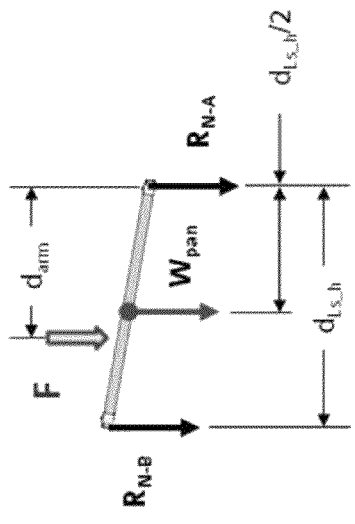
Figure B: Free Body Diagram of Modules
$$\sum M_A = 0 \Rightarrow R_{N-B} = \frac{1}{d_{Ls\_h}} * \left[ (F * d_{arm}) + (\eta * W_{pan} * d_{Ls\_h/2}) \right] \quad \text{Eq 1}$$
$$\sum F_y \Rightarrow R_{N-A} = -(R_{N-B} + F + (\eta * W_{pan})) \quad \text{Eq 2}$$
FIG. 19

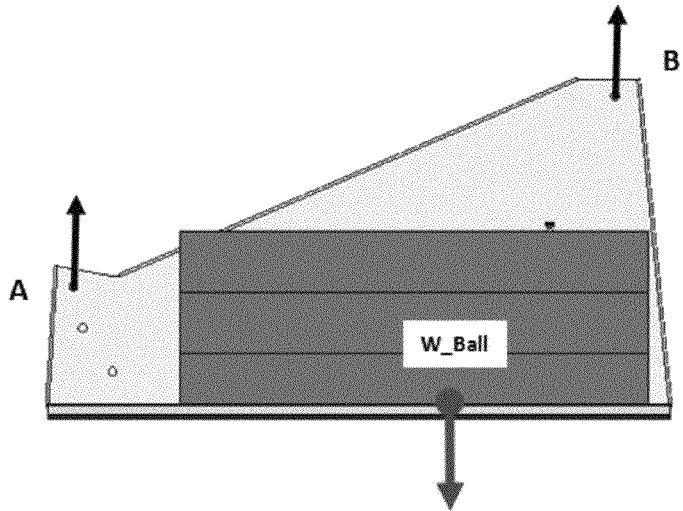

W_bal = Maximum value of: $W_{bal} = \left(\dfrac{1}{\eta_A}\right) * R_A$ or $W_{bal} = \left(\dfrac{1}{\eta_B}\right) * R_B$     Eq 3

$$W_{bal\_all} = \dfrac{1}{\eta} * W_{bal}$$     Eq 4

Ballast to Resist Sliding (Using Figure C):

$$\sum F_y \Rightarrow W_{Bal\_all} = \left(\dfrac{1}{\eta}\right) * \left(\dfrac{F_H}{\mu} + R_{NA} + R_{NB}\right) - W_{Tray}$$     Eq 5

General Ballasting Equations (Without ASCE Dead Weight 0.6 Correction Factor):

Ballast to resist Lift = L - W     Eq 6

Ballast to resist Sliding = (L - W) + (1/μ)H     Eq 7

Where:
L = Lift Wind Force
W = Ballasting Weight
μ = Coefficient between EPDM rubber and roof surface
H = Horizontal Wind Force

SYSTEMS, METHODS AND USER INTERFACE FOR GRAPHICAL CONFIGURATION FOR ROOF MOUNTS

CROSS-REFERENCE

This application is a continuation application of U.S. Ser. No. 13/220,367, filed on Aug. 29, 2011, which is incorporated herein by reference in its entirety.

BACKGROUND

Designing the racking components of a photovoltaic solar system can be a time-consuming process. Several racking manufacturers have developed software that automates steps of this process for rectangular solar arrays. For example, Unirac has created a SolarMount configurator which asks a user to input the number of module rows and columns that define a rectangular array and input the number of arrays, with the assumption that each array is the same shape. Thus, for ground arrays and penetrating roof mount systems, where array shapes may be rectangular in nature, the systems may model and define the number of rows and columns for each array.

For ballasted roof mount systems, non-rectangular arrays may need to be modeled and configured. Thus, there exists a need for systems, methods and user interfaces for configuration for ballasted roof mounts of non-rectangular solar arrays.

SUMMARY

The invention provides systems, methods and user interfaces for graphical configuration for ballasted roof mounts of non-rectangular solar arrays. Various aspects of the invention described herein may be applied to any of the particular applications set forth below. The invention may be applied as a standalone solar mount configuration system or as a component of an integrated software solution. The invention can be optionally integrated into existing business and processes seamlessly, for example, solar mount sales processes. It shall be understood that different aspects of the invention can be appreciated individually, collectively or in combination with each other.

In one aspect of the invention, a system for configuring ballasted roof mounts of a non-rectangular solar array includes: a graphical user interface for creating a layout design of placement of a plurality of solar modules within the non-rectangular solar array which includes: a roof grid representing a roof layout for placement of solar modules within dimensions of a roof of a building, a selection tool for setting an "on" position for placement of one or more solar modules within the roof grid, and a de-selection tool for setting an "off" position for removal of the one or more solar modules within the roof gird; a mechanism for storing inputs for site parameters comprising wind speed, building height, ground snow load; a mechanism for selecting a solar module type; and a server for calculating a bill of materials, ballasting requirements and an overall roof load for the ballasted roof mounts of the non-rectangular solar array.

A method for configuring ballasted roof mounts of a solar array may be provided in accordance with another aspect of the invention. The method may comprise one or more of: dividing a roof mount system into one or more sections, each comprising one or more solar modules; determining a position of the one or more solar modules within the one or more sections; determining load sharing values of the one or more solar modules based on solar module hardware; and determining, based on said position and load sharing, ballasting requirements for the one or more solar modules. In some embodiments, the one or more solar modules each comprise one or more tray configured to receive a ballast. The method may further comprise displaying ballasting requirements for each tray of the solar modules.

Other goals and advantages of the invention will be further appreciated and understood when considered in conjunction with the following description and accompanying drawings. While the following description may contain specific details describing particular embodiments of the invention, this should not be construed as limitations to the scope of the invention but rather as an exemplification of preferable embodiments. For each aspect of the invention, many variations are possible as suggested herein that are known to those of ordinary skill in the art. A variety of changes and modifications can be made within the scope of the invention without departing from the spirit thereof.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIG. 7 illustrates an example of site detail inputs, in accordance with embodiments of the invention.

FIG. 11 illustrates an example of weight requirement determinations, in accordance with embodiments of the invention.

FIG. 12 illustrates an example of weight per tray determinations, in accordance with embodiments of the invention.

FIG. 17 illustrates an example of calculations of various totals for modules in an array, in accordance with embodiments of the invention.

FIG. 19 illustrates forces exerted on the modules due to wind and how those forces manifest at the low sides (A) and high sides (B) of the ballast trays.

FIG. 20 illustrates how to calculate ballast weights sufficient to resist lifting and sliding given the forces calculated in FIG. 19.

FIG. 22 shows another example of output that may be provided by the system, which may include project details and/or bill of materials.

DETAILED DESCRIPTION

Figure 1:
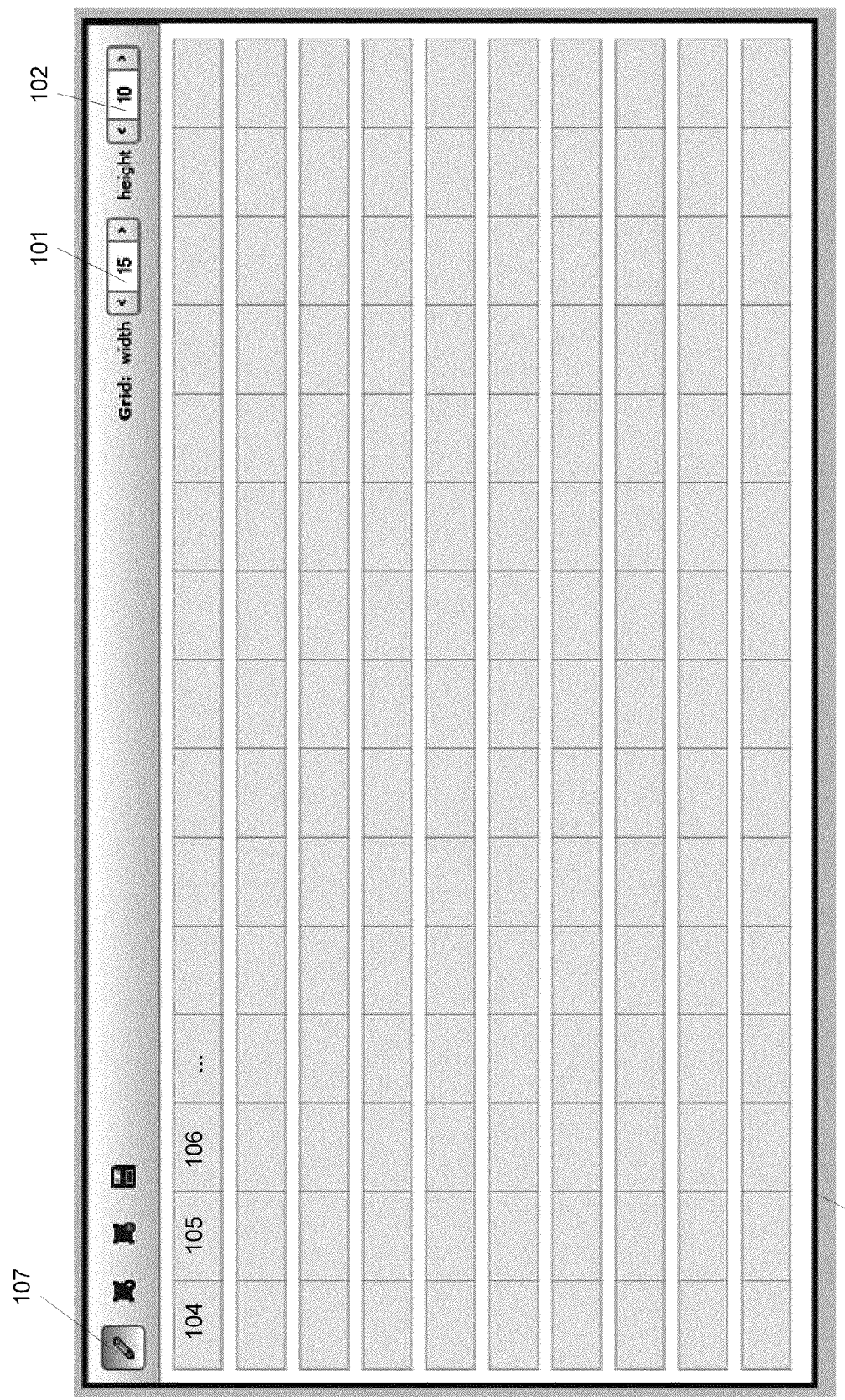
FIG. 1 illustrates a graphical representation of a roof layout provided to assist an operator with defining module placements in an overall array, in accordance with embodiments of the invention.

In the following detailed description, numerous specific details are set forth in order to provide a thorough understanding of the invention. However it will be understood by those of ordinary skill in the art that the invention may be practiced without these specific details. In other instances, well-known methods, procedures, components and circuits have not been described in detail so as not to obscure the invention. Various modifications to the described embodiments will be apparent to those with skill in the art, and the general principles defined herein may be applied to other embodiments. The invention is not intended to be limited to the particular embodiments shown and described.

For ballasted roof mount systems, non-rectangular arrays may need to be modeled and configured. Ballasted systems do not necessarily exhibit the same type of regularity as other systems. For example, two modules in the interior of a large ballasted roof array might require different amounts of weight. Engineering constraints for each module of a ballasted roof mount system may depend on the other modules in the system, rather than global values for the whole array.

When trying to configure a ballasted roof mount system, one approach is to decompose it into logical sections which are typically regular geometric shapes (often rectangular). Once the array has been broken down into logical sections, the weight necessary to hold down a module to ensure that the system does not move or lift up given expected wind and other loads may be calculated based on the modules position in the section. For example, modules that have no other modules on their high side (or Northern Modules as further described below) require the most weight. Modules with no other modules attached to their low sides (or Southern Modules as further described below) require the least weight. The remaining modules require an intermediate amount.

In addition, modules can also distribute load to the other modules and racking that are attached to their rising sides (sides between the high side and low side, which may be called "east" and "west" sides). When stiffening beams are used to connect six or more modules, ballast requirements may be reduced. Thus, the greater amount of load they can distribute, the less weight they need placed on the trays to which they are directly attached; as a result, any rows in a section that include fewer than six modules attached directly in the east to west direction may be treated as a special case.

Further, roof mounted systems may also have gaps between modules to avoid collisions with things that protrude from the roof (pipes, HVAC, exists, or other obstacles). Various obstacles may be handled by imposing rules that ensure that sections start and stop around these gaps such that they are not included in a section, however, it may be difficult and time consuming to decompose an array into sections that do not violate any rules, and may often result in sections that need to be treated as special cases.

Referring to FIG. 1, a graphical representation of a roof layout may be provided to assist an operator with defining module placements in an overall array. The operator may provide certain dimensions for the roof grid (e.g., by specifying a width 101, height 102, etc.). The roof grid 103 may be formed by creating potential module placements 104, 105, 106, etc. depending on the type of solar modules which are selected for placement. The operator may determine and provide the work area size and module dimensions and the system, as a result, may display a grid that represents all of the possible locations where a module could be placed. Alternatively, the system may provide a default sized grid (e.g. 10×10) and allow the user to add columns and rows when needed. Each module box may be clicked "on" or "off," where "on" represents that the operator would like to place a module in the position and "off" represents that no module is to be placed in the particular position.

Figure 2:
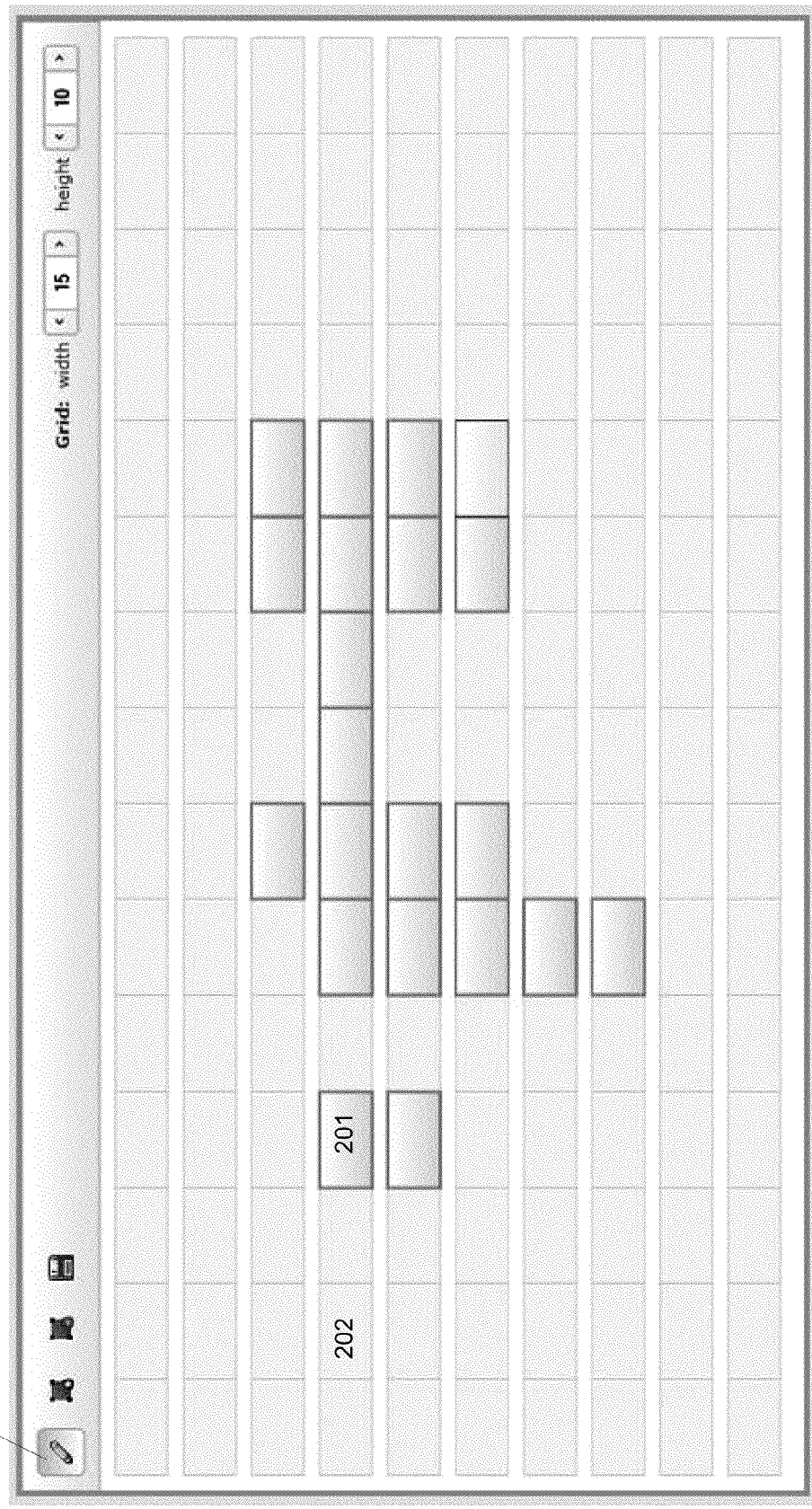
FIG. 2 illustrates an example of a use of an individual solar module selection tool where the module boxes may be clicked "on" or "off" one at a time, in accordance with embodiments of the invention.

Referring to FIG. 2, the module boxes may be clicked "on" (for example, 201) or "off" (for example, 202) one at a time, allowing the operator to define desired module placement locations. Thus, the clickable grid provides a mechanism for the user to click "on" a cell in the grid to make a module visible (or click "off" to make it go away). The individual selection tool 203 allows the operator to click module boxes individually. A module box that is clicked once will be turned "on" and may change color, for example. If the same module box is clicked again, then the module box may be turned "off" and restored to the original state. The boxes may be clicked on and off using a mouse, touch screen or any other device. This graphical input method may provide a faster and more accurate mechanism for describing the user's desired array configuration than other approaches including describing the array as a collection of logical sections.

One or more tool for setting an "on" position for placement of one or more solar modules within the roof grid and/or for setting an "off" position for removal of the one or more solar modules within the roof grid may be provided. In one example, a single tool may be useful for setting "on" and "off" positions for the solar modules. In another example, a separate selection tool may be provided for setting an "on" position, and a separate de-selection tool may be provided for setting an "off" position. Any number of tools may be provided for setting "on" and/or "off" positions.

Alternatively, "on" and "off" positions may be determined according to one or more imported file. The imported file may be a computer aided design (CAD) file, such as, but not limited to, AutoCAD, Solidworks, Solid Edge, TurboCAD, VariCAD, Advance Design, ArchiCAD, or Revit. The imported file may be any other graphics related file including but not limited to drawing programs, design programs, photo programs. The imported file may comprise data representative of one or more image. The image may be representative of a layout of one or more solar modules. The image may be representative of a surface upon which one or more solar modules are to be laid out (e.g., roof, wall, structure, ground). In one example, the imported file may include data or an image of a roof (or other surface) upon which one or more solar modules will be laid out. The image and/or data associated with the image may include one or more dimensions for the solar modules or the surface upon which the solar modules are to be laid out. Based on the image, a tool may select placement of one or more solar modules. The placement selection may include determining whether a position for a solar module is on or off. The placement selection may also include the number of solar modules, the locations of the solar modules, and/or the connections between solar modules.

In some embodiments, one or more solar module arrangement may be exported to a program. In some embodiments, one or more solar module arrangement may be exported as a CAD file or any other image file. The solar module arrangement may be exported to a CAD program, graphics/image program, or another type of external program. In some embodiments, the exported file may include information such as positions of individual solar modules (including selected or deselected solar modules), dimensions, ballasting requirements, expected loads, costs, components, or any other information described herein. The exported file may include images of the positions of solar modules and/or any other information described elsewhere herein.

Figure 3:
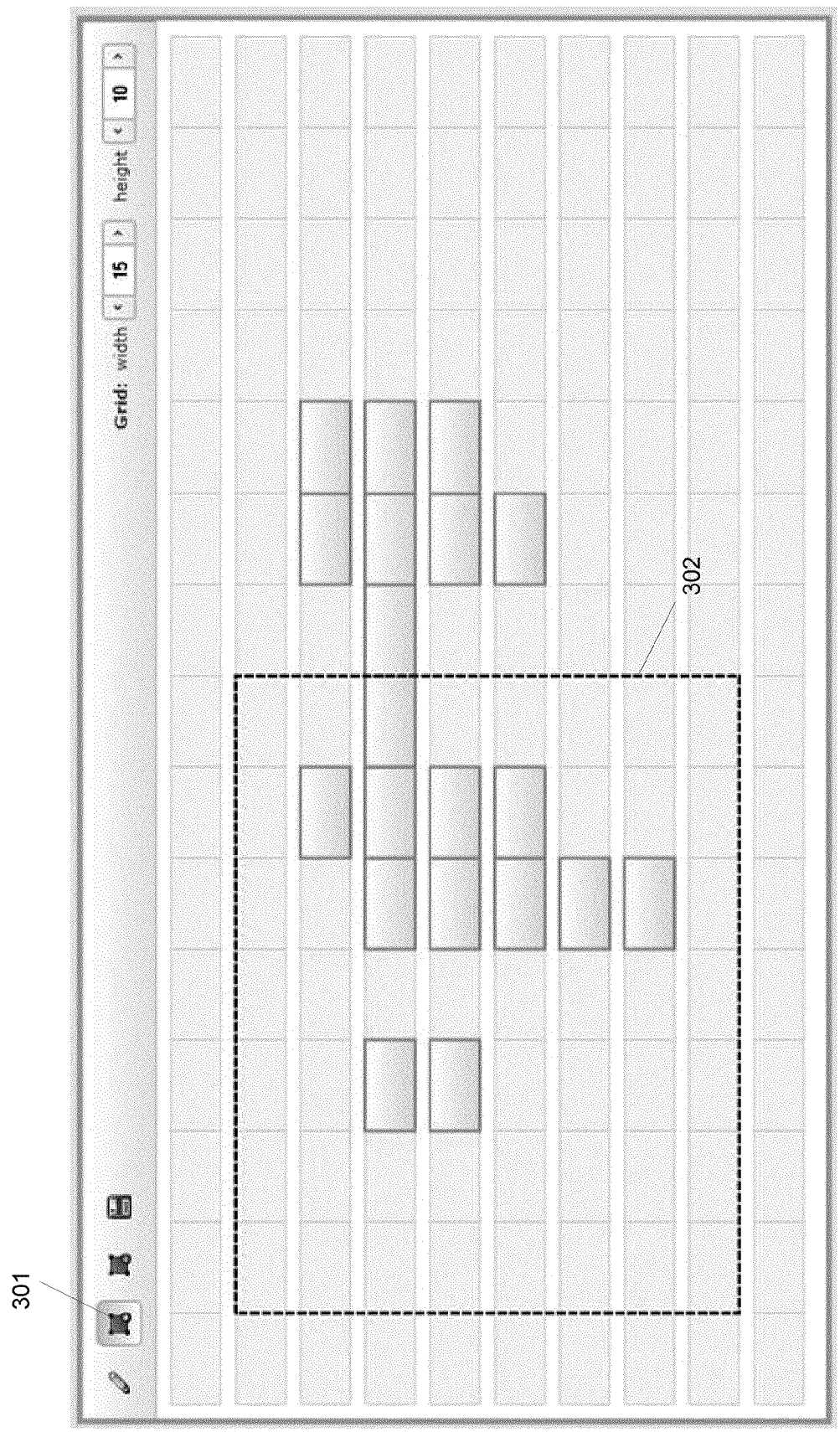
FIG. 3 illustrates an example of a use of a multiple module selection tool, in accordance with embodiments of the invention.
Figure 4:
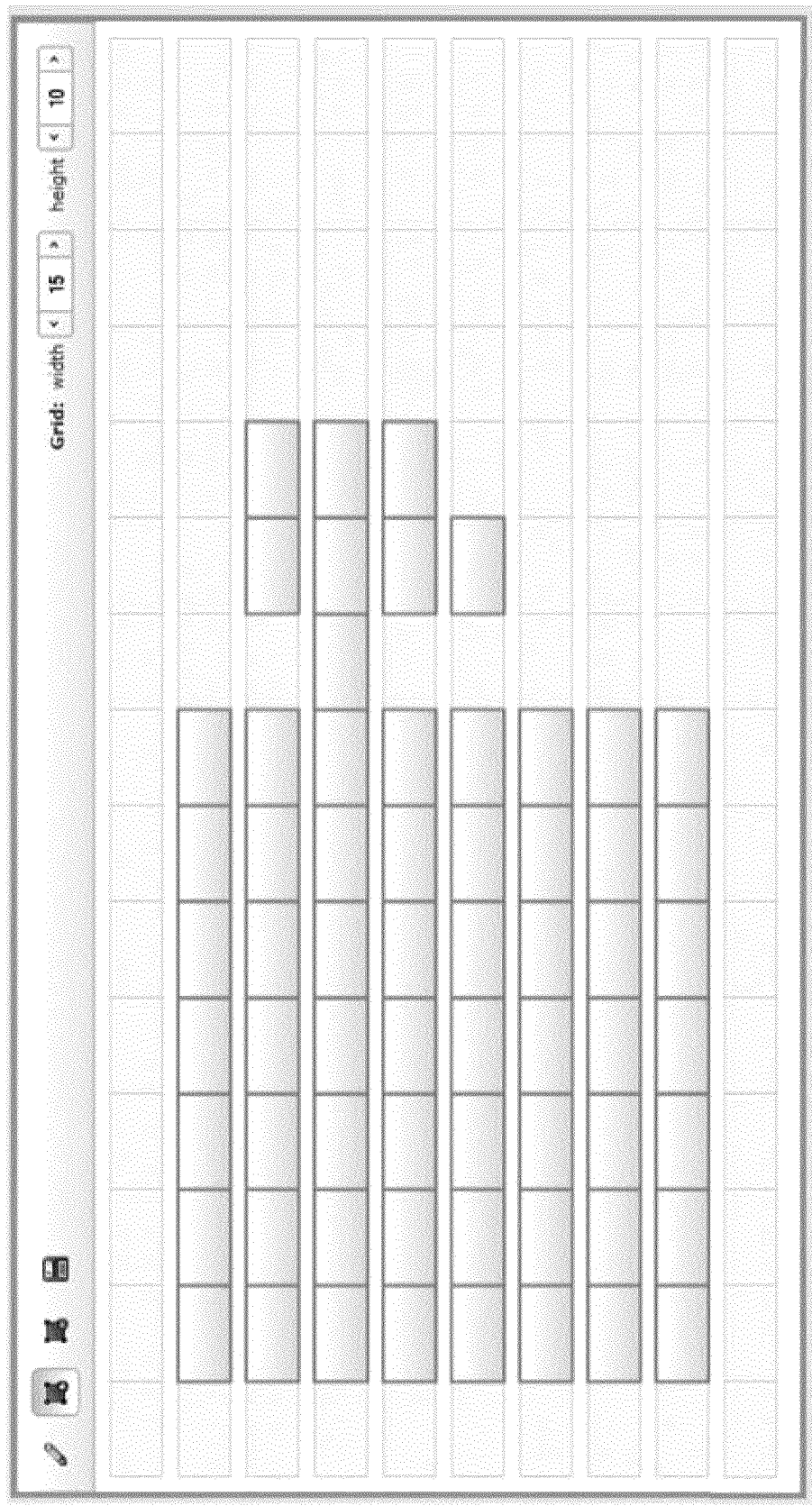
FIG. 4 illustrates an example of a result of a use of the multiple module section tool (e.g., as shown in FIG. 3), in accordance with embodiments of the invention.
Figure 5:
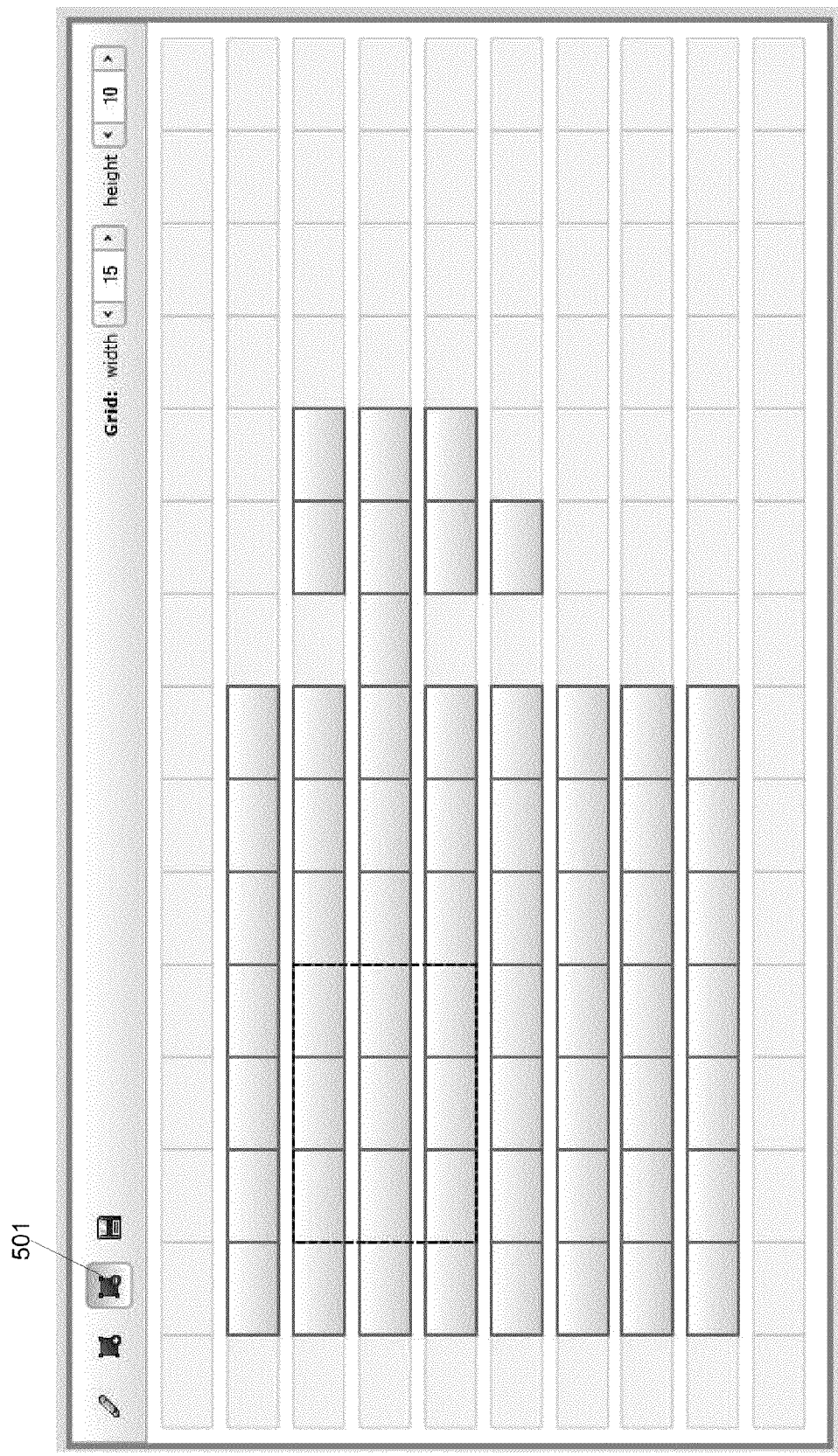
FIG. 5 illustrates an example of a use of a multiple de-selection tool, in accordance with embodiments of the invention.
Figure 6:
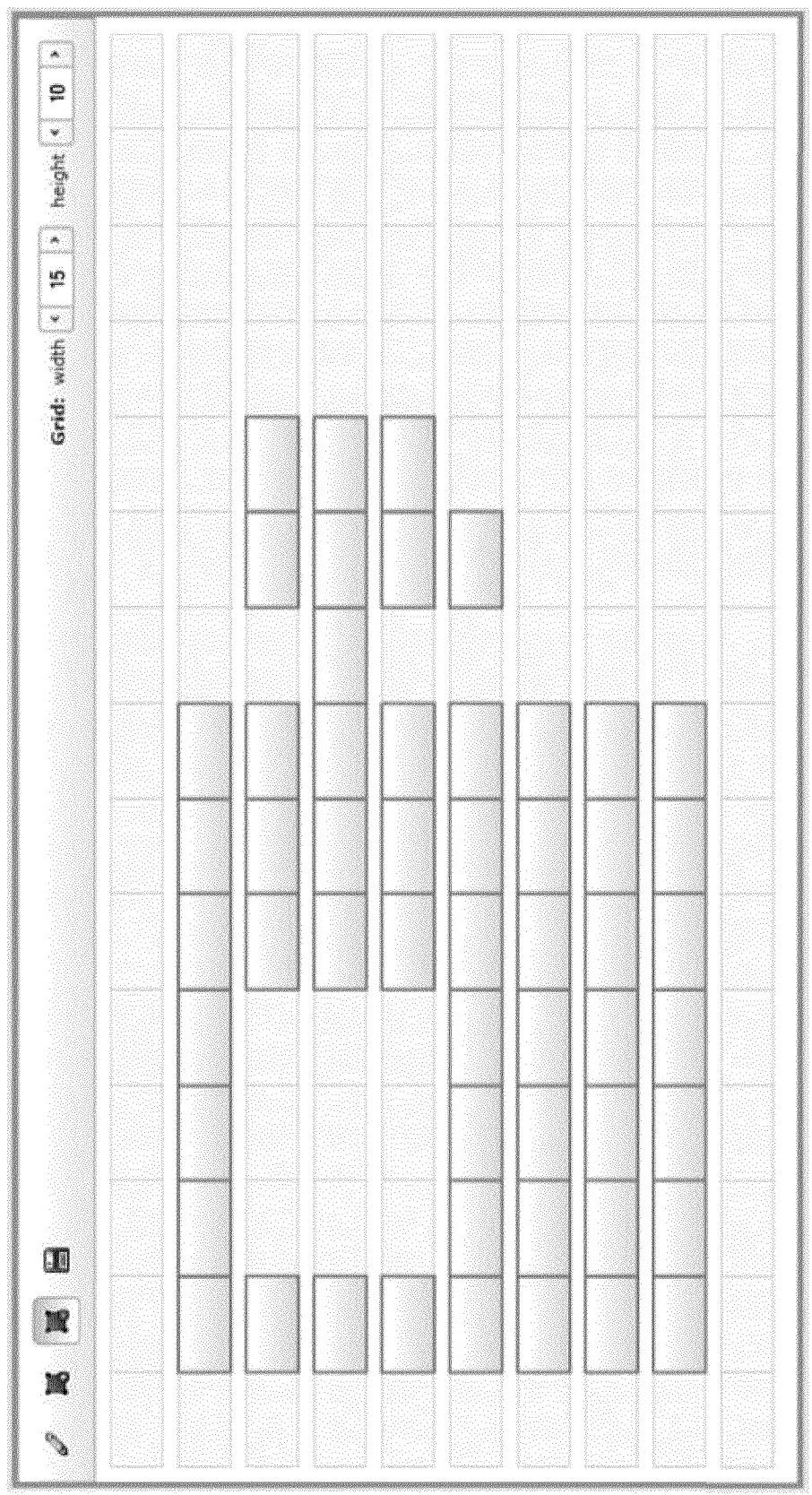
FIG. 6 illustrates an example of a result of a use of the multiple module de-section tool (e.g., as shown in FIG. 5), in accordance with embodiments of the invention.

For larger arrays, the system may provide the ability to multi-select a range of cells to turn an entire grid or an entire section of a grid on or off. FIG. 3 illustrates use of a multiple module selection tool 301. By using the multiple selection tool 301, a user or operator may click and drag a pointer to select multiple modules at the same time 302 to turn more than one module on or off. FIG. 4 illustrates the result of the user's selection in FIG. 3, resulting in multiple modules being turned "on." In FIG. 5, a multiple module de-selection tool 501 may allow an operator to turn "off" multiple modules at the same time. FIG. 6 illustrates the result of the multiple module de-selection of FIG. 5.

By using this graphical interface, the user or operator may select module placements in a graphical representation. The user may drag and highlight multiple module placements in an efficient manner. As a result, a grid of possible module locations is created.

Figure 7:
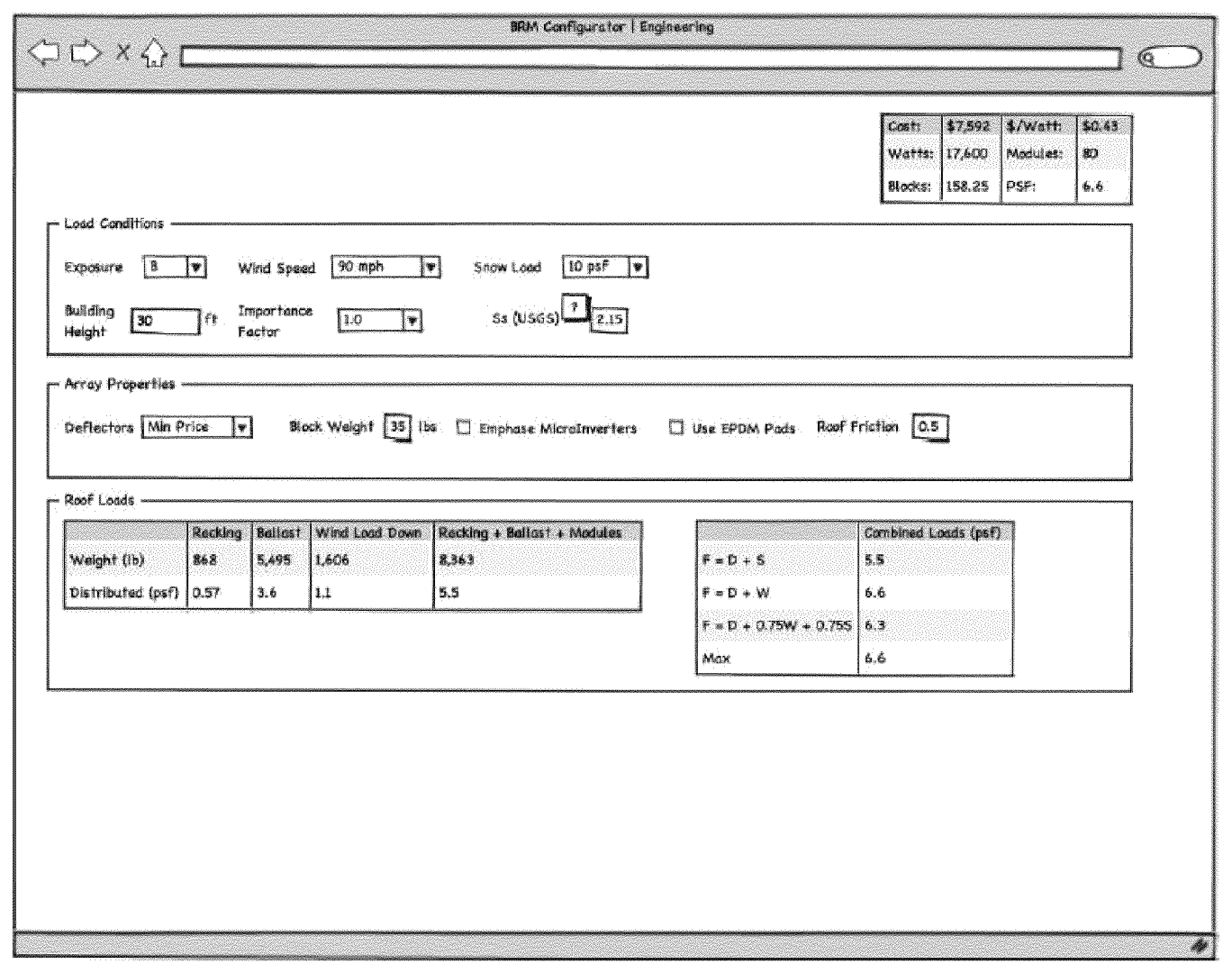

In addition to the layout of the array, the operator may also provide certain site parameters to the configuration system. For example, wind speed, exposure category, building height, module dimensions, importance factor, and other factors may be provided. Referring to FIG. 7, site details may include installation site parameters (building height, least horizontal roof distance, exposure, wind speed, ground snow load, importance factor, ballast block weight, etc.) and module parameters (width, length, thickness, weight, power, array style, etc.). In addition, various quotation details may be provided including a quotation number, name of person/entity providing the quotation, revision version number, date, company, contact name, company address, contact phone, contact email, project name, project address, module manufacturer, module model, etc.

From the information and data inputted and the array specification as entered by the user using the graphical interface, the system may calculate a complete bill of materials, customer pricing, ballasting requirements and overall roof loads for projects, using the project specific parameters and array configuration inputs. In particular, the amount of weight needed to ensure that the system does not move or lift up given expected wind and other loads may be easily calculated.

Position

Figure 8:
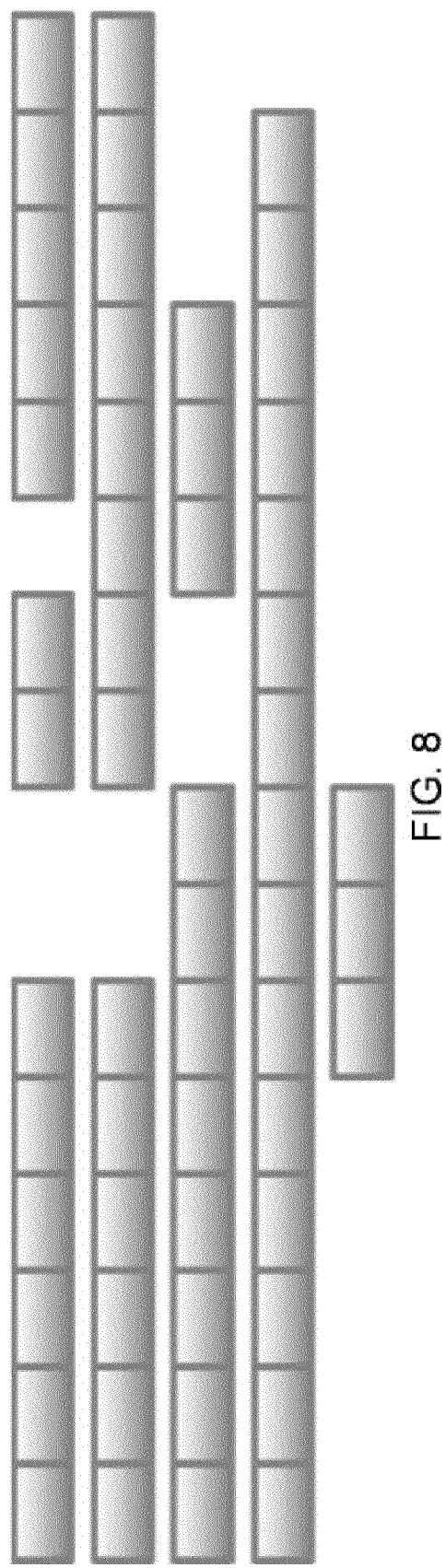
FIG. 8 illustrates an example of the array specification as entered by the user, in accordance with embodiments of the invention.
Figure 9:
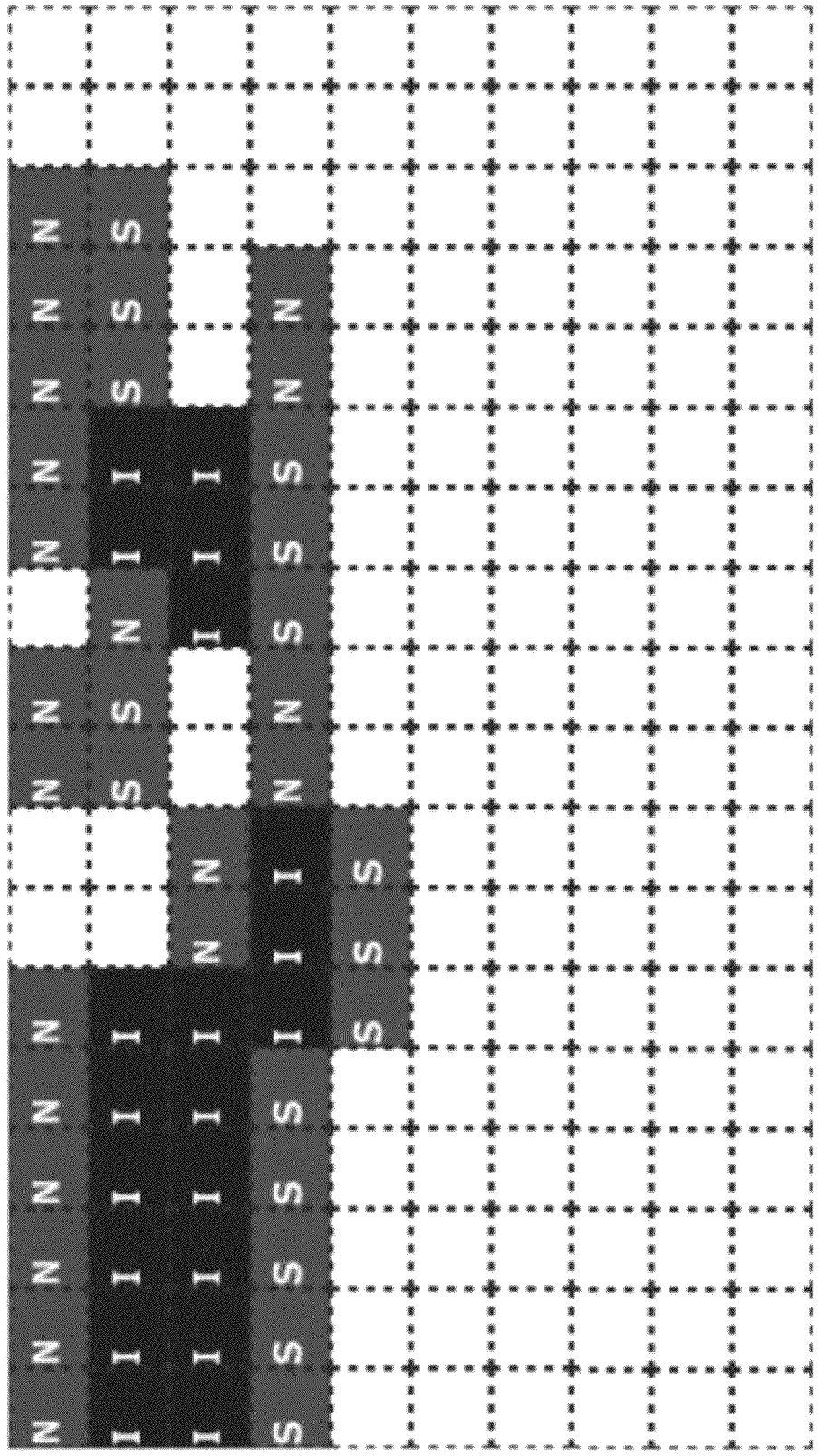
FIG. 9 illustrates an example of a layout with position determinations, in accordance with embodiments of the invention.

FIG. 8 illustrates an example of the array specification as entered by the user as described above. The array specification as shown in FIG. 8, as entered by the user, may be uploaded to a server for processing. Referring to FIG. 9, a layout with position determinations is shown. For each "on" cell (or selected cell), the server may examine its north and south neighbors. If a cell does not have another "on" cell immediately to its north, then it is flagged as a North cell ("N"). If a cell does not have another "on" cell immediately to its south, then it is flagged as a South cell ("S"). Cells that are neither North nor South are flagged as Internal cells ("I").

Load Sharing

Figure 10:
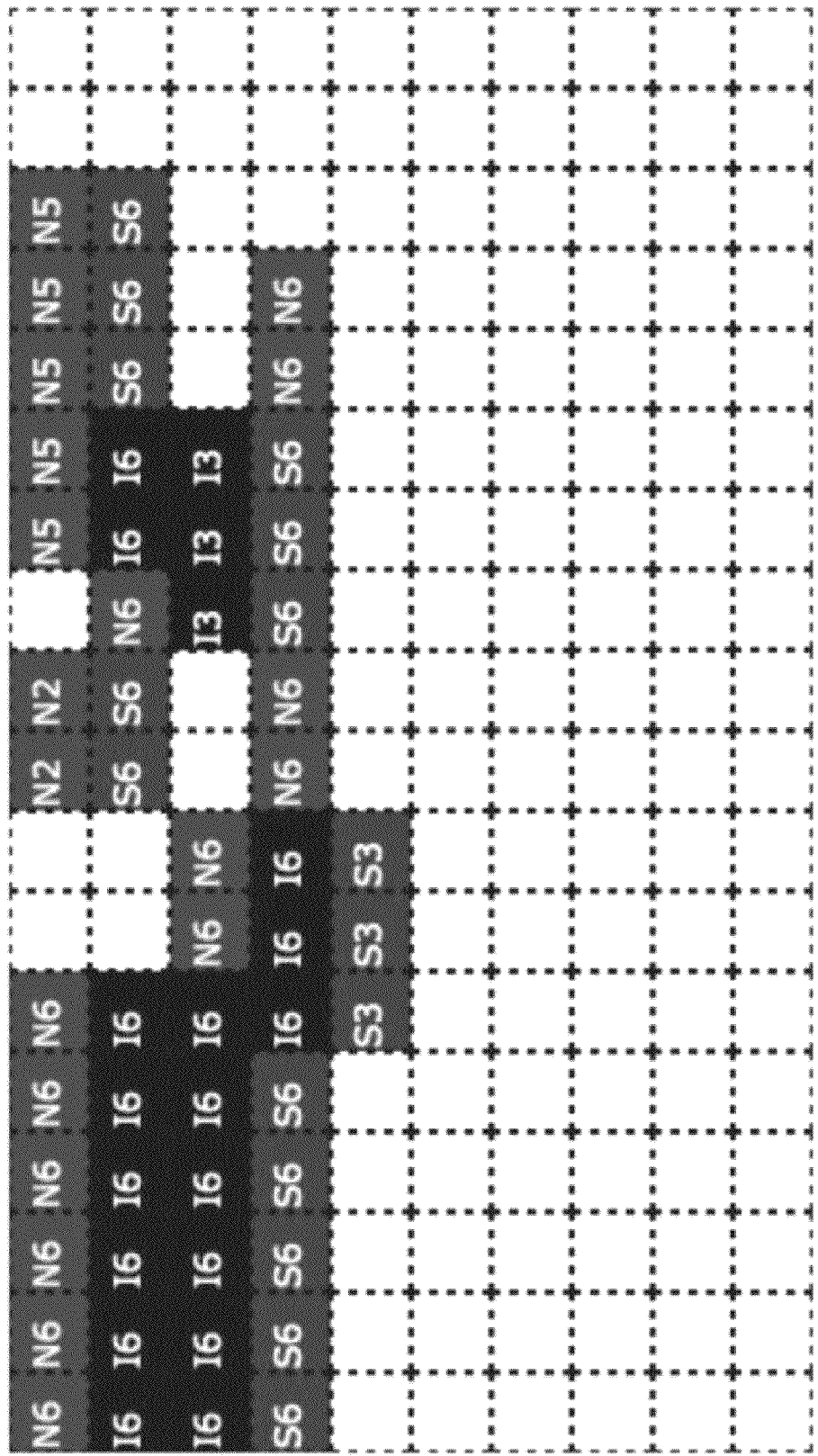
FIG. 10 illustrates an example of load sharing determinations, in accordance with embodiments of the invention.

In FIG. 10, the load sharing for the array is determined. When calculating load sharing, considerations of whether the hardware used allows adjacent cells to stiffen each other (for example, if both have deflectors attached and those deflectors connect to each other) may be made. If the hardware does not allow mutual stiffening, then the cell may be treated as if it had no neighbors and its neighbor counts may be set to 0.

If the hardware allows cells to mutually stiffen, then if a cell ("c") has a cell to its east ("e"), then (c.left_neighbors=e.left_neighbors+1) and (c.right_neighbors=e.right_neighbors−1). Otherwise, (c.left_neighbors=0). Starting with the next cell to the west ("w"), active cells directly connected may be counted while moving west. The count may be stopped as soon as an empty cell or the edge of the grid is hit ("right_neighbors"). Then, values may be set such that c.right_neighbors=right_neighbors. The results of such load sharing calculations are shown in FIG.

Tray Weight Calculation

Once a cell has been classified with position and load sharing values, the weight that the cell requires may be referenced from a table calculated based on the environmental conditions such as wind speed, snow load, exposure, tilt angle, importance factor, building height, etc. from a target sight. FIG. 11 illustrates an example of the weight requirements that have been determined for various cells. For example, a cell that is north and shares with 3 others may require a 175 pound load ("c.weight").

Figure 12:
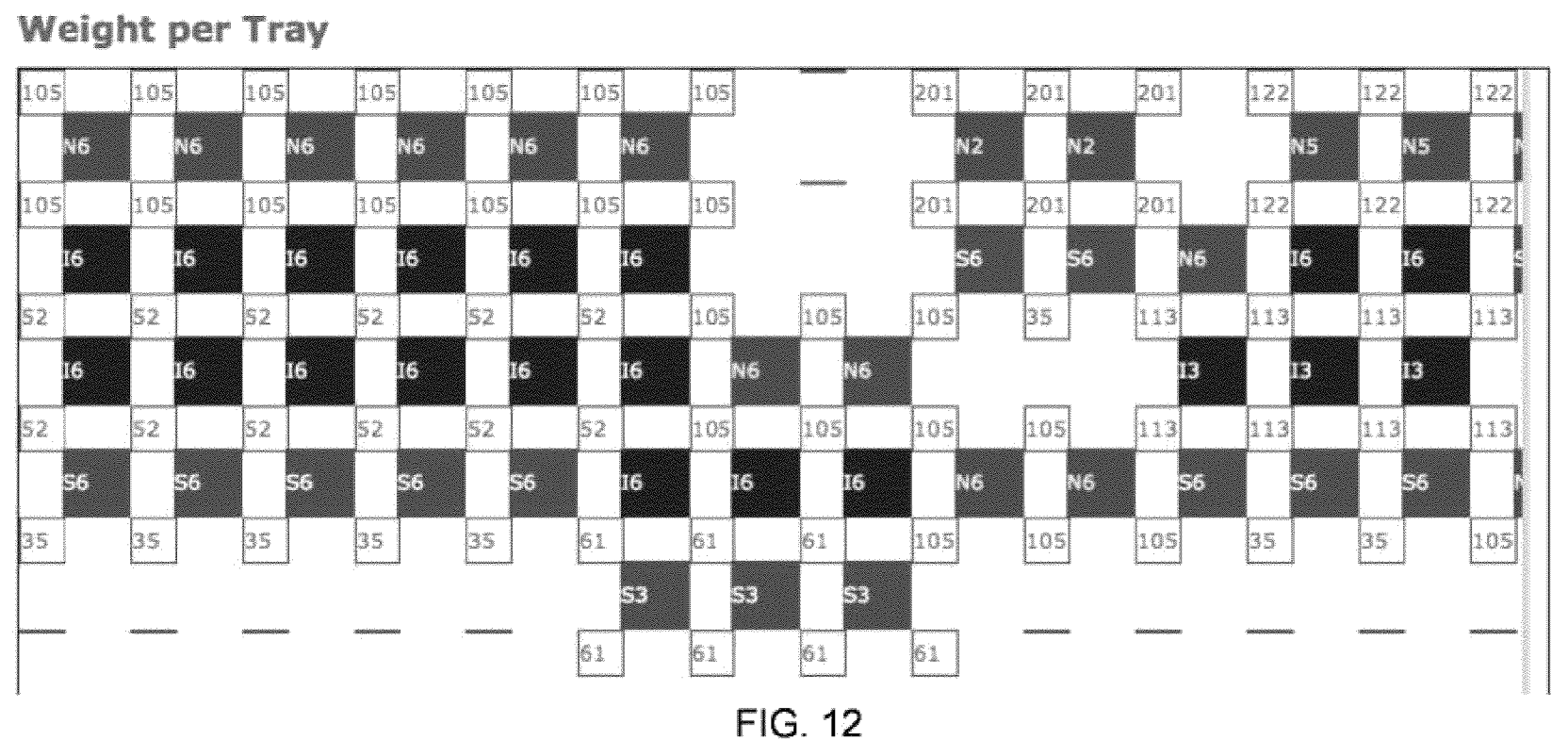

If a cell is "on" all trays attached to the cell will need to be present and weighted. Further, for all the attached trays ("t"), each tray ("t") is set to "on" and t.weight=max (c.weight, t.weight). As shown in FIG. 12, an example of the weight per tray calculation is illustrated. As shown in FIG. 12, the system has placed trays at the corners between cells, but other geometries are also possible. For example, trays may be placed at the north, south, east or west sides, there may be two trays placed per cell, or a single central tray per cell. Trays that are attached to multiple "on" cells may have their weight set multiple times, but will end with their weight set to the heaviest weight required by any of the cells to which they are attached. As shown in FIG. 12, the trays with the actual weight required at that point can be provided to an installer, such that the installer can understand how to construct the system appropriately and to facilitate such installation.

Figure 13:
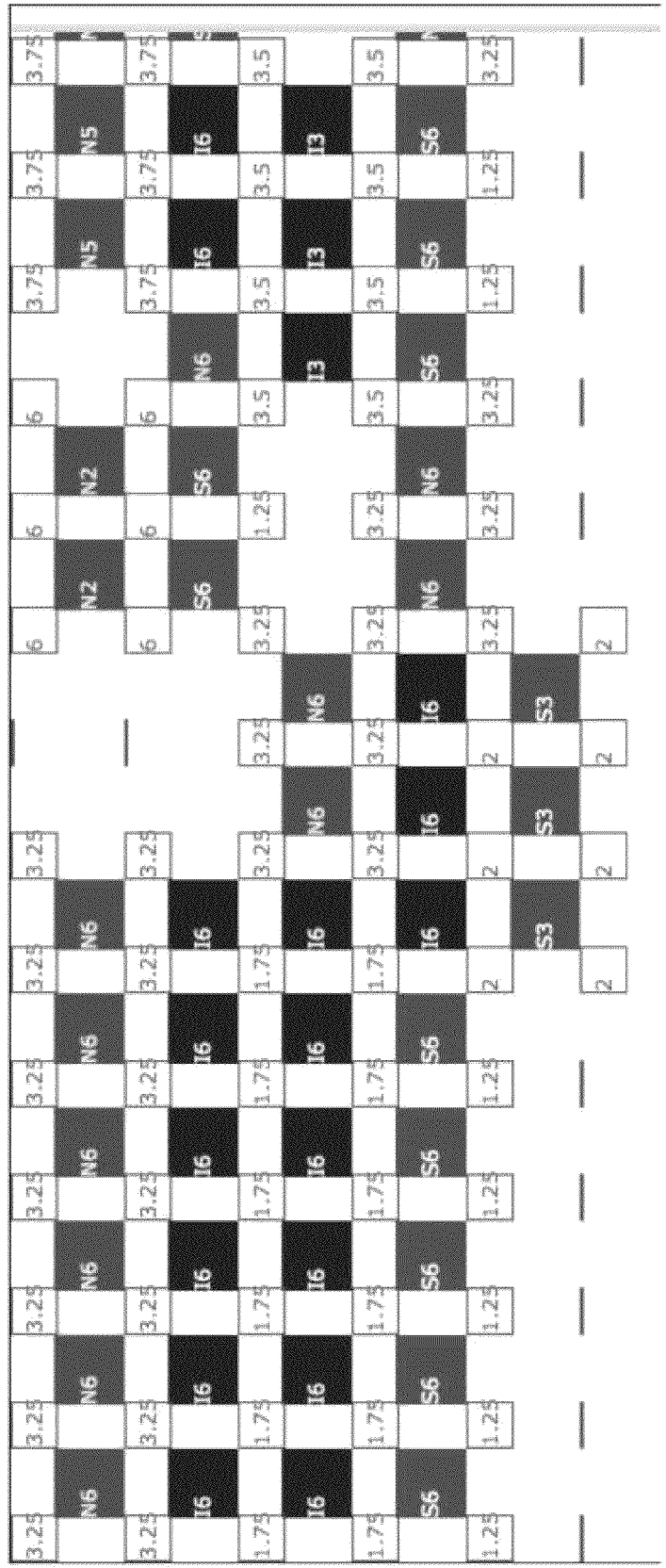
FIG. 13 illustrates an example of blocks per tray determinations, in accordance with embodiments of the invention.

Alternatively, however, since the weight used to hold down trays in ballast roof mount systems may be provided by cement blocks that can be deployed in quarter, half and full block chunks, the system may also display a graphical map of the weight requirements converted into units of blocks as well, as illustrated in FIG. 13.

In some embodiments, the amount of ballast and/or weight required for each tray of a solar module may be calculated. The amount of ballast and/or weight for each tray may be displayed on a graphical user interface. The ballasting requirements may be displayed on a roof grid representing a roof layout and/or other graphical display. For instance, a numerical value for the ballasting requirements (e.g., in weight or in number of ballast chunks) may be displayed in a graphical representation of a tray for one or more solar modules that may illustrate a solar mount system.

Other Alternative Classifications, Calculations and Categories

Figure 14:
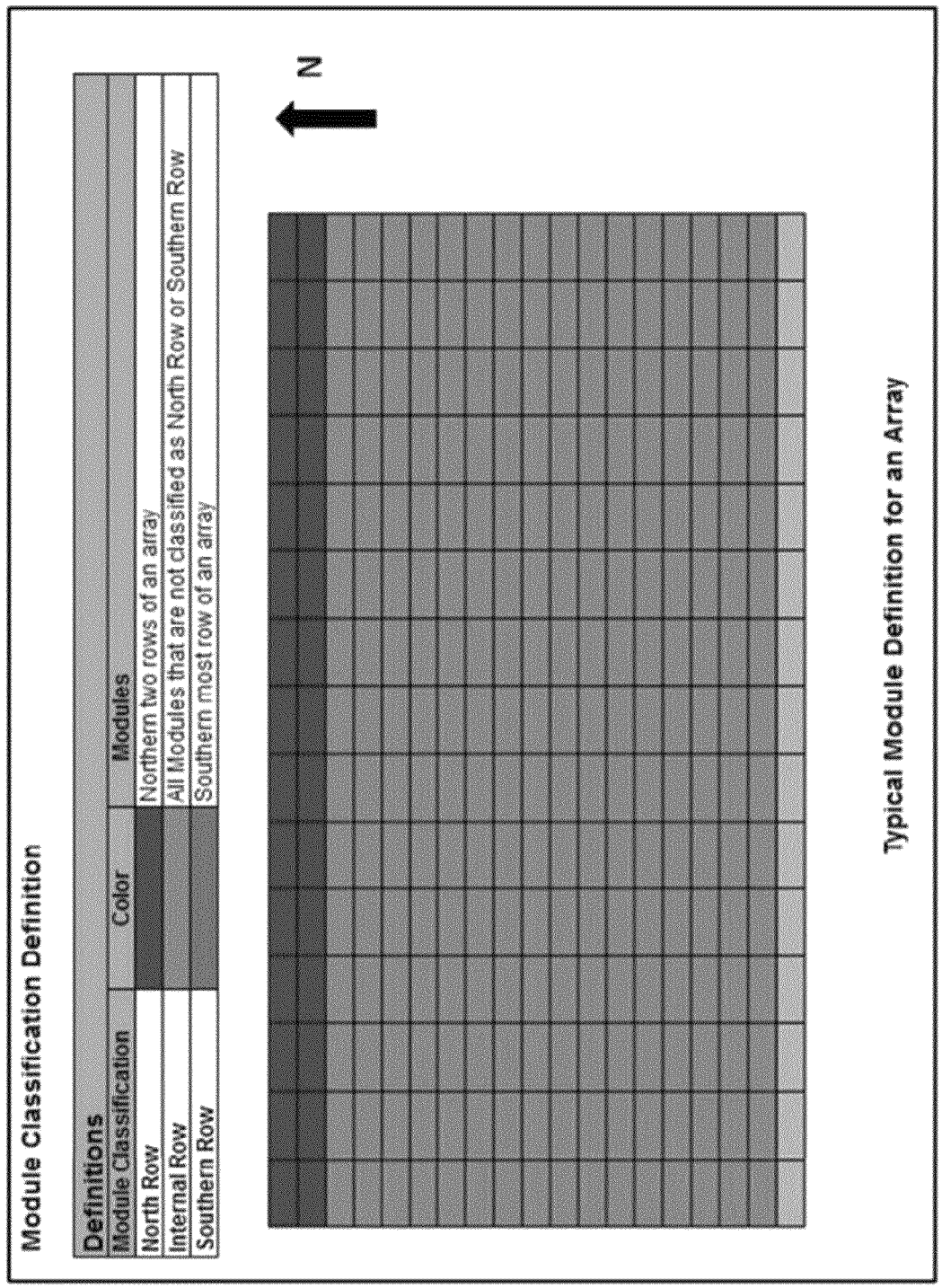
FIG. 14 illustrates an example of module classifications for modules in an array, in accordance with embodiments of the invention.

In addition, in another embodiment, as shown in FIG. 14, the system may classify the modules uploaded to the server from the graphical interface input into three categories ("Categories"). The Categories may be either (1) northern two rows of an array ("Northern Row"), (2) southern-most row of an array ("Southern Row"), or (3) all other modules that are not classified as Northern Row or Southern Row ("Internal Row").

The system may also separate the arrays into various arrays that contain the maximum number of modules from east to west but do not contain a row with an east or west edge that is adjacent to another array ("Subarrays"). In other words, the system will not define any Subarrays that connect to another Subarray on its east or west edge. For example, in defining a Subarray, the system may start from the northwest corner of a particular Subarray, and then select the maximum number of columns (or modules) east, to the northeast corner of that Subarray. This selection may define the Northern Row of that Subarray. The system may then select the maximum number of rows south of that Northern Row that do not connect to another Subarray on its east or west edge, and this will define that Subarray.

Figure 15:
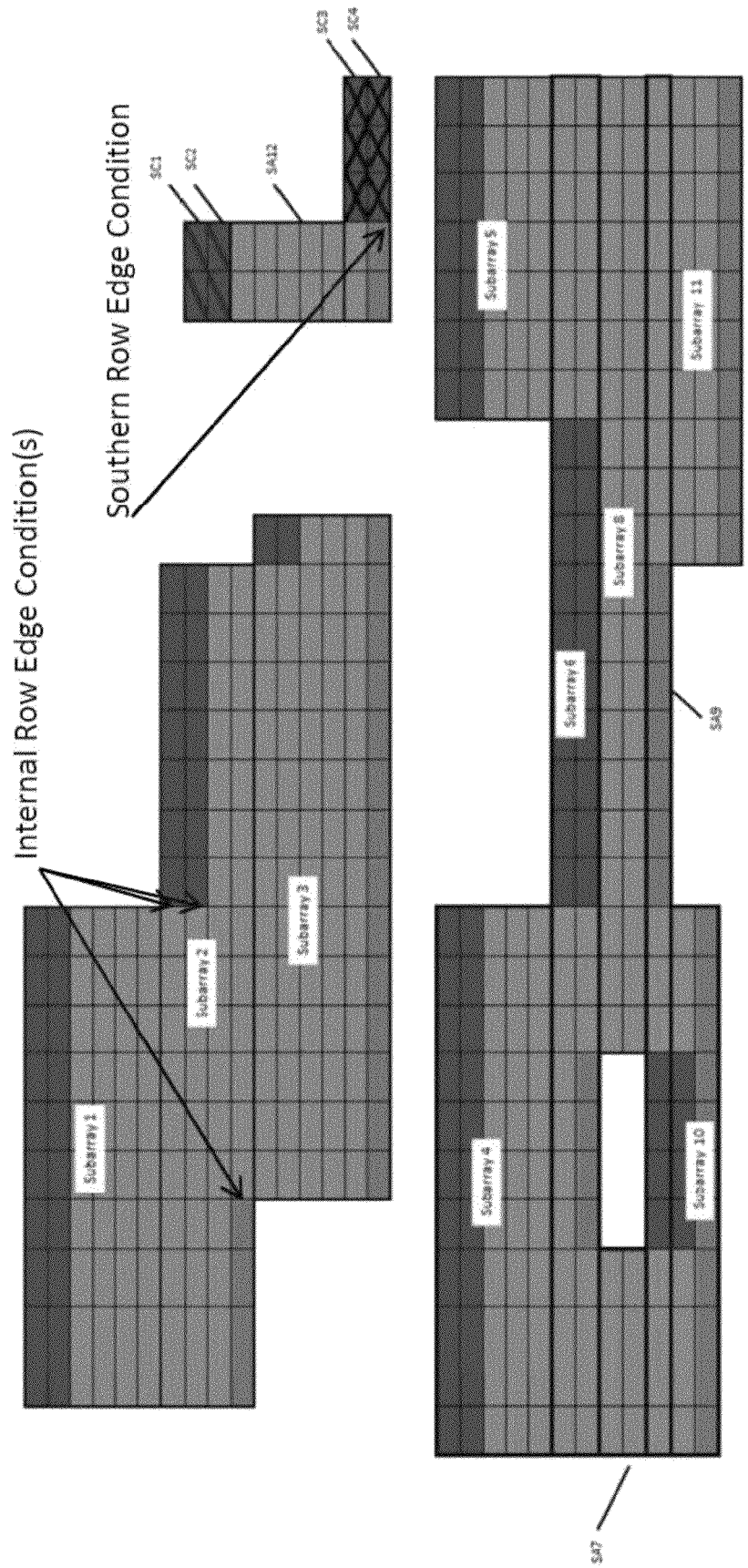
FIG. 15 illustrates an example of subarray determinations for modules in an array, in accordance with embodiments of the invention.

As shown in FIG. 15, samples of various Subarray definitions are shown. Each single continuous east to west row in a subarray with the same module Classification is a "Section." For example, Subarray 2 in FIG. 15 has two Northern Row Sections, four Internal Row Sections, and one Southern Row Section. Subarray 8 in FIG. 15 has only two Internal Row Sections, zero Northern Row Sections, and zero Southern Row Sections.

In addition to defining the Internal Row Sections per Subarray, the system may also calculate how many of the Internal Row Sections are connected to a Northern Row or Southern Row on an east or west edge. In other words, if an Internal Row Section is adjacent to a Northern Row or Southern Row on its east or west edge, then that would be an "Internal Row Edge Condition." For example, Subarray 2 of FIG. 15 has four Internal Row Sections with three east or west edges connected to a Northern or Southern Row. Therefore, Subarray 2 has three Internal Row Edge Conditions. As another example, Subarray 9 of FIG. 15 has only two Internal Row Sections but zero east or west edges connected to a Northern or Southern Row. Therefore, Subarray 8 has zero Internal Row Edge Conditions.

Further, the system may also calculate "Southern Row Edge Conditions" which are Southern Row Sections that are connected to a Northern Row on its east or west edge. In other words, if a Southern Row Section is adjacent to a Northern Row (not an Internal Row) on its east or west edge then that would be a "Southern Row Edge Condition." For example, Subarray 4 in FIG. 15 has one Southern Row Section with one east or west edge connected to a Northern Row module. Therefore, Subarray 4 has one Southern Row Edge Condition.

From the graphical entries of modules in the array, the system may calculate the number of Northern Row Modules, Southern Row Modules, and Internal Row Modules for each Subarray. Further, the system may also calculate how many rows of modules have at least one Northern Row Module but less than six modules total (a "Special Case Subarray"). In other words, a Subarray Section that has between one and five modules in a row and contains at least one Northern Row Module would be considered a Special Case Subarray.

Figure 16:
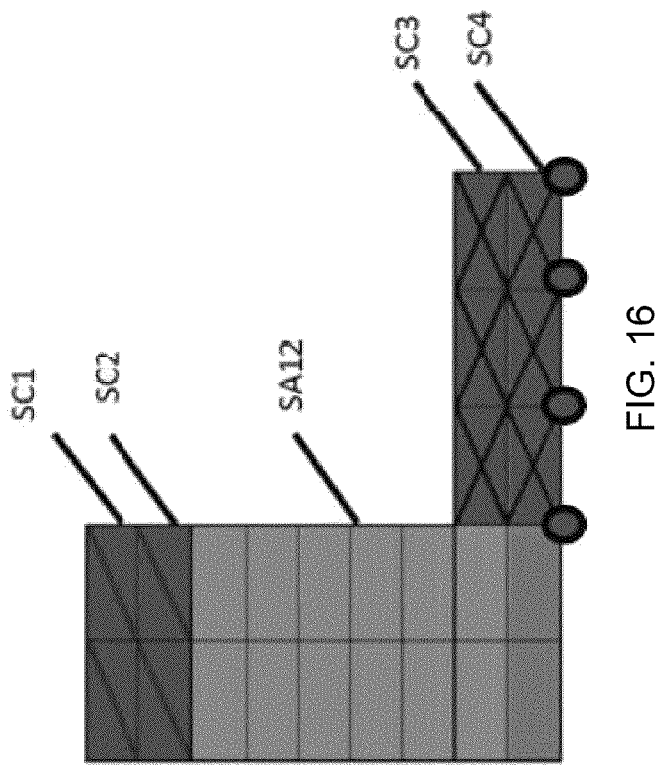
FIG. 16 illustrates an example of special case classifications, in accordance with embodiments of the invention.

Special considerations may apply if the Subarrays are Special Case Subarrays. As shown in FIG. 16, different ballast may be required for these special cases. The Special Case North Row Module Classification table shows how the ballasting requirements may be defined for certain conditions. For example, if a Special Case Subarray has three modules total, then the total Northern Row Modules in that Special Case may be tagged with one classification, whereas a Special Case Subarray with five modules total may be tagged with a different classification.

Various totals may be calculated, such as (1) the total number of modules on the northern edge of an array; (2) the total number of modules on the western edge of an array; (3) the total number of modules on the eastern edge of an array; (4) the total number of modules on the southern edge of an array; (5) the total number of Northern Row Modules on the east or west edge; and (6) the total number of Southern Trays not classified as a Southern Tray. With respect to the totals in #1-5, these refer to the modules that are on the outside edge of an array. The total number of modules would refer to all Subarrays including Special Case Subarrays. For #6, the total would be the number of Northern Row Module trays on a southern edge of an array, which includes noting the ballasting difference between Special Case Northern Row Modules and just standard Northern Row Modules on a southern edge. For example, referring to FIG. 16, Special Case Subarray #4 has five modules total and therefore has four total Northern Row Modules trays and therefore would be considered in the "5-E/W Connect" classification of the Tray Replacement Classification table as shown in FIG. 17.

Figure 18:
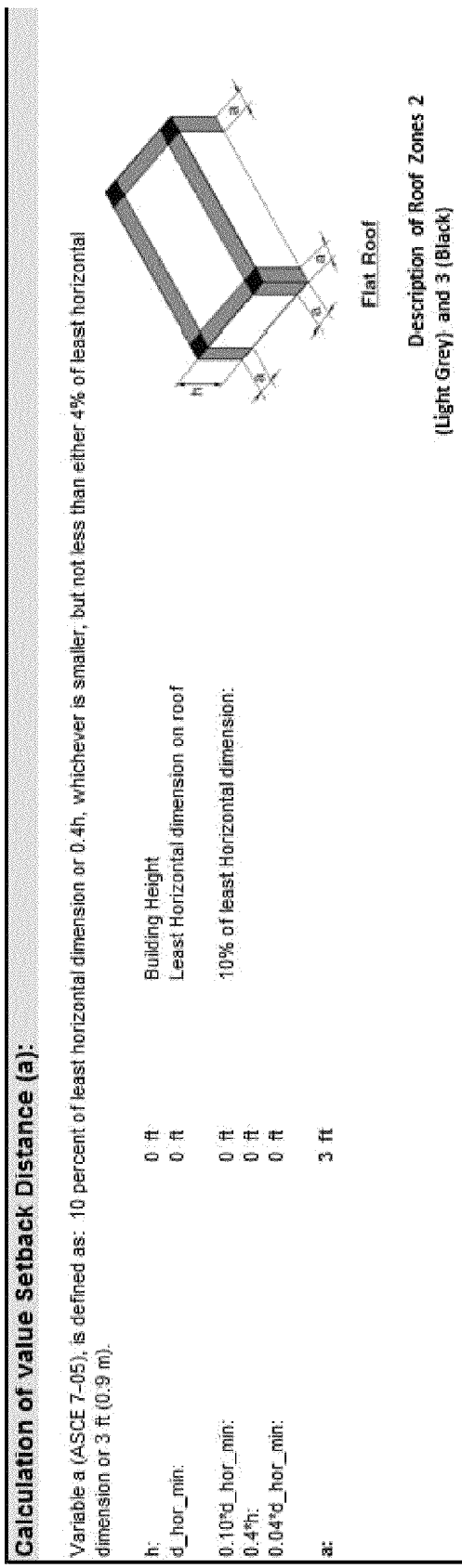
FIG. 18 illustrates an example of calculations for setback distances, in accordance with embodiments of the invention.

The system may also take into account whether additional components or ballasting is needed for special circumstances or for extra parts. For example, additional tray sets, mid clamp assemblies, end clamp assemblies, deflectors, wire straps, modules, grounding lugs, or other components may be included. The system may additionally take into account whether there is a setback distance required, as shown in FIG. 18.

FIGS. 19 and 20 provide illustrations of "standard" structural engineering formulas that may or may not be incorporated within the systems and methods described herein. For instance, FIG. 19 illustrates forces exerted on the modules due to wind and how those may manifest at low sides (A) and high sides (B) of the ballast trays. FIG. 20 illustrates calculations for ballast weights sufficient to resist lifting and sliding given wind forces.

Figure 21:
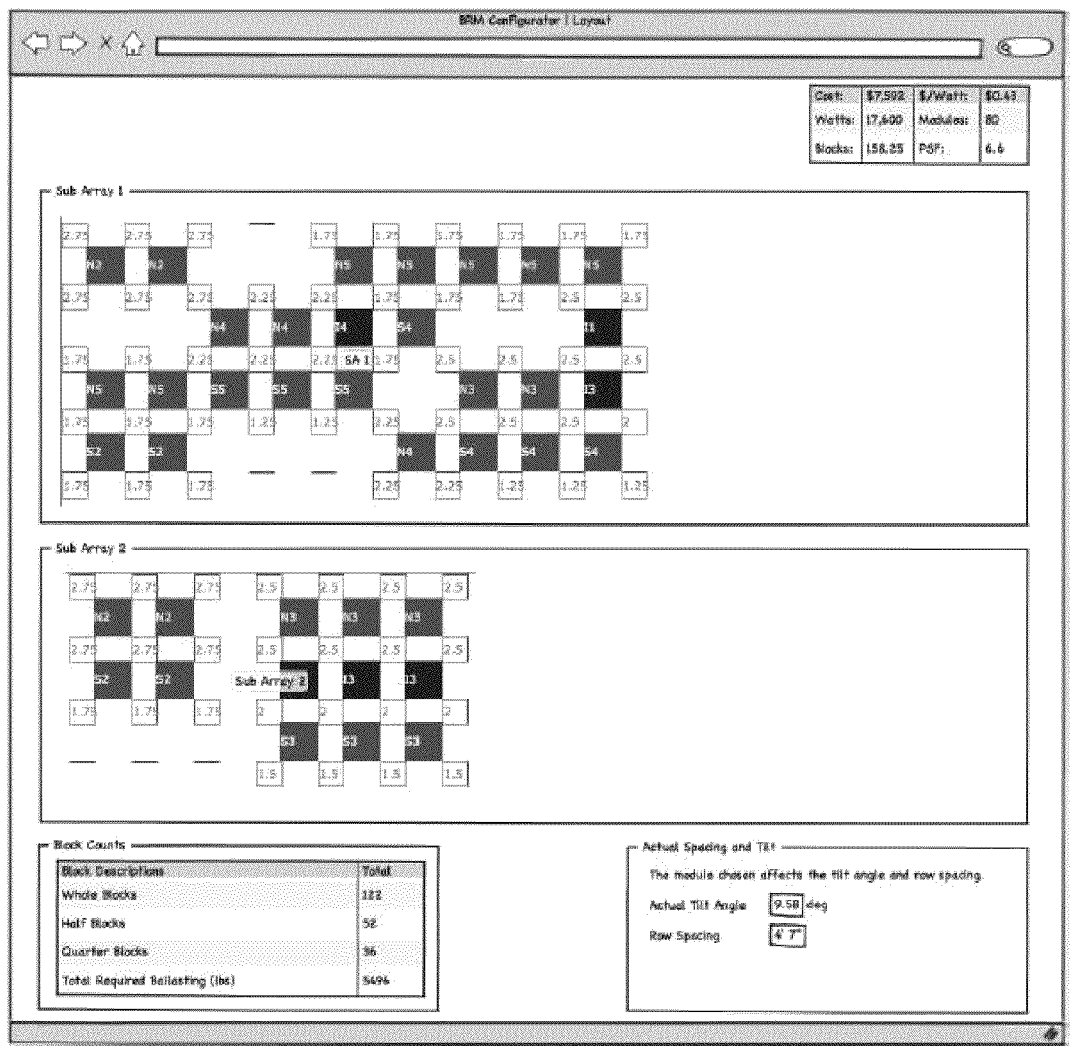
FIG. 21 shows an example of output that may be provided by the system in accordance with an embodiment of the invention, which may include an illustration of one or more array or sub array.
Figure 22:
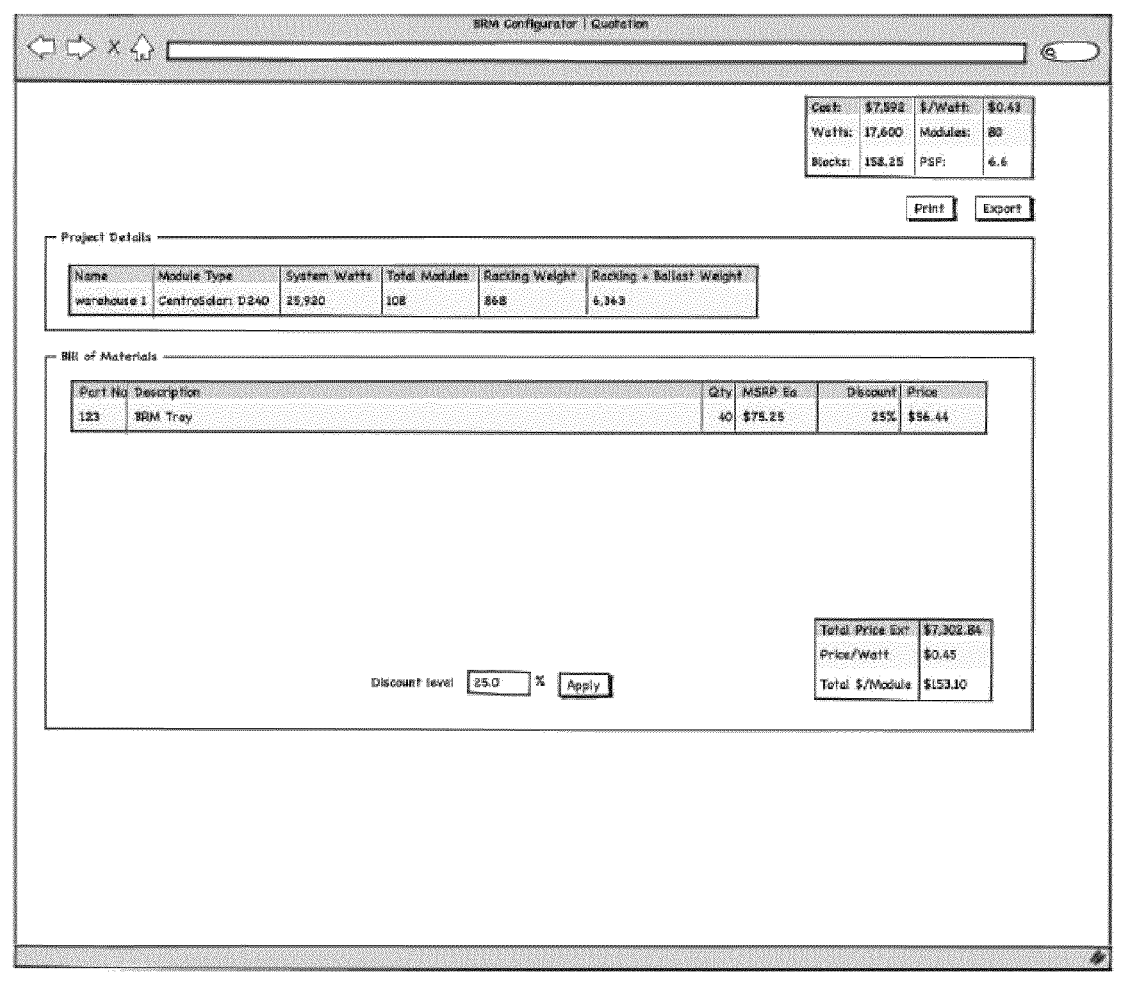

FIGS. 21 and 22 illustrate examples of output that may be provided by the system which may be provided to an installer, such that the installer can understand how to construct the system appropriately and to facilitate such installation. For example, such information may include roof pressures, internal costs, customer pricing, fabrication costs, and a bill of materials. Further it is possible for a quotation to be generated from such information or for a customer to be able to purchase the materials easily if the system is integrated with an online web store application for purchasing such materials. FIG. 21 includes an example of output that may include the layout of one or more array or sub arrays. FIG. 22 includes an example of an output that may include project details and/or bill of materials.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

While this invention has been described and illustrated with reference to particular embodiments, it will be readily apparent to those skilled in the art that the scope of the invention is not limited to the disclosed embodiments but, on the contrary, is intended to cover numerous other modifications and equivalent arrangements which are included within the spirit and scope of the following claims.

Aspects of the systems and methods described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the systems and methods include: microcontrollers with memory, embedded microprocessors, firmware, software, etc. Furthermore, aspects of the systems and methods may be embodied in microprocessors having software-based circuit emulation, discrete logic (sequential and combinatorial), custom devices, fuzzy (neural network) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

It should be noted that the various functions or processes disclosed herein may be described as data and/or instructions embodied in various computer-readable media, in terms of their behavioral, register transfer, logic component, transistor, layout geometries, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, email, etc.) over the Internet and/or other computer networks via one or more data transfer protocols (e.g., HTTP, FTP, SMTP, etc.). When received within a computer system via one or more computer-readable media, such data and/or instruction-based expressions of components and/or processes under the systems and methods may be processed by a processing entity (e.g., one or more processors) within the computer system in conjunction with execution of one or more other computer programs.

Unless specifically stated otherwise, as apparent from the following discussions, it is appreciated that throughout the specification, discussions utilizing terms such as "processing," "computing," "calculating," "determining," or the like, may refer in whole or in part to the action and/or processes of a processor, computer or computing system, or similar electronic computing device, that manipulate and/or transform data represented as physical, such as electronic, quantities within the system's registers and/or memories into other data similarly represented as physical quantities within the system's memories, registers or other such information storage, transmission or display devices. It will also be appreciated by persons skilled in the art that the term "users" referred to herein can be individuals as well as corporations and other legal entities. Furthermore, the processes presented herein are not inherently related to any particular computer, processing device, article or other apparatus. An example of a structure for a variety of these systems will appear from the description below. In addition, embodiments of the invention are not described with reference to any particular processor, programming language, machine code, etc. It will be appreciated that a variety of programming languages, machine codes, etc. may be used to implement the teachings of the invention as described herein.

Unless the context clearly requires otherwise, throughout the description and the claims, the words 'comprise,' 'comprising,' and the like are to be construed in an inclusive sense as opposed to an exclusive or exhaustive sense; that is to say, in a sense of 'including, but not limited to.' Words using the singular or plural number also include the plural or singular number respectively. Additionally, the words 'herein,' 'hereunder,' 'above,' 'below,' and words of similar import refer to this application as a whole and not to any particular portions of this application. When the word 'or' is used in reference to a list of two or more items, that word covers all of the following interpretations of the word: any of the items in the list, all of the items in the list and any combination of the items in the list.

The above description of illustrated embodiments of the systems and methods is not intended to be exhaustive or to limit the systems and methods to the precise form disclosed. While specific embodiments of, and examples for, the systems and methods are described herein for illustrative purposes, various equivalent modifications are possible within the scope of the systems and methods, as those skilled in the relevant art will recognize. The teachings of the systems and methods provided herein can be applied to other processing systems and methods, not only for the systems and methods described above.

The elements and acts of the various embodiments described above can be combined to provide further embodiments. These and other changes can be made to the systems and methods in light of the above detailed description.

In general, in the following claims, the terms used should not be construed to limit the systems and methods to the specific embodiments disclosed in the specification and the claims, but should be construed to include all processing systems that operate under the claims. Accordingly, the systems and methods are not limited by the disclosure, but instead the scope of the systems and methods is to be determined entirely by the claims.

While certain aspects of the systems and methods are presented below in certain claim forms, the inventor contemplates the various aspects of the systems and methods in any number of claim forms. Accordingly, the inventor reserves the right to add additional claims after filing the application to pursue such additional claim forms for other aspects of the systems and methods.

The invention claimed is:

1. A system for configuring ballasted mounts for supporting a solar array at an installation site, the system comprising:
a graphical user interface configured to receive first input data indicating a layout design of an arrangement of a plurality of solar modules within the solar array and second input data indicating parameters of the installation site; and
a server comprising at least one processor for determining ballasting requirements for the ballasted mounts of the solar array, wherein determining the ballasting requirements comprises determining an amount of ballast for holding down the plurality of solar modules based at least in part on the first and second input data.

2. The system of claim 1, wherein determining the amount of ballast comprises determining an amount of ballast weight for holding down the plurality of solar modules.

3. The system of claim 1, wherein determining the amount of ballast comprises determining a number of ballast blocks for holding down the plurality of solar modules.

4. The system of claim 1, wherein the graphical user interface comprises a graphical representation of the arrangement of the plurality of solar modules within the solar array.

5. The system of claim 4, wherein the graphical representation comprises a plurality of sections, each section of the plurality of sections representing a corresponding placement position for a solar module.

6. The system of claim 5, wherein each section of the plurality of sections is user-interactive so as to permit a user to indicate placement or removal of a solar module from the corresponding placement position.

7. The system of claim 5, wherein the graphical representation comprises a grid having a number of rows and a number of columns.

8. The system of claim 7, wherein at least one of the number of rows or the number of columns is adjustable by a user.

9. The system of claim 1, wherein the parameters of the installation site comprise one or more of: exposure category, ground snow load, wind speed, building height, or ballast block weight.

10. The system of claim 1, wherein the graphical user interface is further configured to receive third input data indicating a solar module type for the plurality of solar modules.

11. The system of claim 10, wherein the ballasting requirements are further determined based on the third input data.

12. The system of claim 1, wherein the at least one processor determines a bill of materials for the ballasted roof mounts based on the ballasting requirements.

13. The system of claim 12, wherein the at least one processor determines a price quotation for the bill of materials.

14. A method for configuring ballasted mounts of a solar array at an installation site, the method comprising:
receiving, via a graphical user interface, first input data indicating a layout design of an arrangement of a plurality of solar modules within the solar array;
receiving, via the graphical user interface, second input data indicating parameters of the installation site; and
determining, based at least in part on the first and second input data and with aid of at least one processor, ballasting requirements for the ballasted mounts of the solar array, wherein determining the ballasting requirements comprises determining an amount of ballast for holding down the plurality of solar modules.

15. The method of claim 14, wherein determining the amount of ballast comprises determining an amount of ballast weight for holding down the plurality of solar modules.

16. The method of claim 14, wherein determining the amount of ballast comprises determining a number of ballast blocks for holding down the plurality of solar modules.

17. The method of claim 14, wherein the graphical user interface comprises a graphical representation of the arrangement of the plurality of solar modules within the solar array.

18. The method of claim 14, wherein the parameters of the installation site comprise one or more of: exposure category, ground snow load, wind speed, building height, or ballast block weight.

19. The method of claim 14, further comprising: receiving, via the graphical user interface, third input data indicating a solar module type for the plurality of solar modules.

20. The method of claim 14, further comprising: determining, with aid of the at least one processor, a bill of materials for the ballasted roof mounts based on the ballasting requirements.

* * * * *